UNITED STATES PATENT OFFICE.

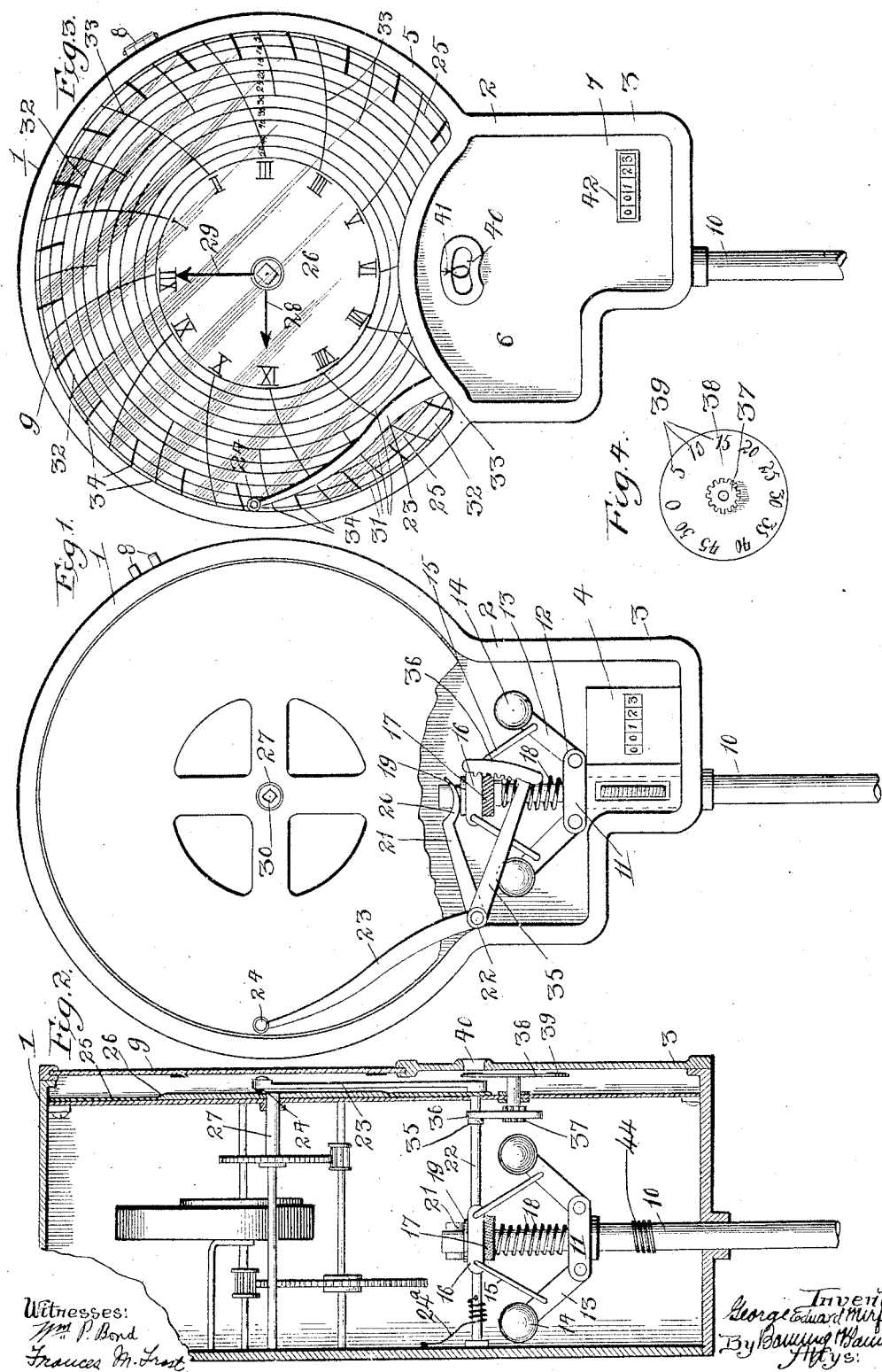

GEORGE EDWARD MIRFIELD, OF JOLIET, ILLINOIS.

COMBINED SPEED INDICATOR AND RECORDER.

No. 871,946.   Specification of Letters Patent.   Patented Nov. 26, 1907.

Application filed March 5, 1906. Serial No. 304,298.

*To all whom it may concern:*

Be it known that I, GEORGE EDWARD MIRFIELD, a citizen of the United States, residing at Joliet, in the county of Will and State of Illinois, have invented certain new and useful Improvements in a Combined Speed Indicator and Recorder, of which the following is a specification.

This invention is intended more particularly for use in connection with automobiles, and is intended to be combined with and actuated in part by a clock or chronometer ordinarily carried on an automobile, and the object of the invention is to provide a simple, convenient and easily readable speed recorder and indicator which will keep a constant record of the rate of speed at or during any particular period of time, and will also indicate on suitably arranged dials the time of day, rate of speed, record of speed, and record of distance traveled. The speed record is intended to be indicated upon a suitable chart which can be easily renewed from day to day, so that a full and complete record of the daily speed of the automobile in easily readable form can be obtained and filed for future reference. Such a record, when maintained for some time, will afford a basis for calculating the results obtained from a given consumption of fuel, and also in a general way the character of the roads traveled over, and other data of an interesting and valuable character.

The invention further relates to the means employed for attaching the record dial to and actuating it by the clock or chronometer ordinarily carried, to the construction of the clock dial, the means for simultaneously indicating the rate of speed and recording the same; to the means for mounting and actuating the cyclometer which registers the total distance traveled, and to the mounting and positioning of the several parts within a suitable casing of compact form and attractive appearance and adapted to be mounted at a suitable point to be easily observed by the operator.

In the drawings Figure 1 is a front elevation of the device with the front plate and dial removed; Fig. 2 a sectional elevation of the same; Fig. 3 a face view of the entire device; and Fig. 4 a face view of the speed indicator disk.

The mechanism hereinafter described is mounted within a cylindrical casing 1 having at its lower side a square housing 2 one side of which is extended to form a pocket 3 for the reception of a chronometer 4 of any suitable and well known character. The casing is inclosed in front by means of an open curved dial frame 5 to the lower ends of which is secured a plate 6 adapted to cover the housing 2, and said plate is provided at one corner with a projection 7 adapted to cover and inclose the chronometer pocket. The dial frame and plate are secured to the casing by means of a hinge 8 which enables the entire closing face to be turned back for adjustment of the interior mechanism. The dial frame serves as a mounting for a dial glass 9 which has painted or otherwise indicated thereon the figures constituting the dial face of the clock in suitable proximity to the clock mechanism to be hereinafter referred to.

The housing 2 has suitably journaled therein an actuating shaft 10 which is connected in any suitable manner with the running gear of the automobile or other vehicle, and said shaft has secured thereto at a suitable point a collar 11 having ears 12 to which are pivoted governor arms 13 having on their ends governor balls 14 of the usual character. The governor arms are supported by means of links 15 connected at their upper ends to a slidable collar 16. The slidable collar bears against an adjusting screw 17 which is adapted to regulate the tension of the spring 18 which encircles the actuating shaft intermediate the collar 11 and the adjusting nut. Above the adjusting nut is a glass disk or collar 19 which serves as a bearing for the forked end 20 of an actuating arm 21. The arm 21 is secured to a transversely extending rock shaft 22 to which is connected a recorder arm 23 having mounted at its end a stylus 24 or other suitable recording instrument.

The stylus is adapted to mark a line on a recording chart 25 which is in the form of a ring and is adapted to encircle a plain center disk 26 preferably of white porcelain which serves as a reading surface for the numerals marked in black or other contrasting color on the surface of the glass dial face of the instrument. The center disk is mounted on the movable tubular shaft or arbor 27 of the clock mechanism, which may be of any ordinary character. To the arbor 27 is attached the hour hand 28 of the clock, which of course requires twelve hours to make a complete revolution, and the hour hand, the plain faced disk and the record chart are all intended to move together and to make one complete revolution with every twelve hours. The clock also has the usual minute hand 29 secured to the inner arbor 30.

The record chart has marked thereon a plurality of concentric circles 31 which are intended to represent the speed of travel in miles per hour, and, as shown, are numbered from 5 to 50, although any other scheme of numbering might be employed. The concentric circles are divided into twelve spaces or divisions 32 by means of lines 33 which are drawn across the face of the record chart using the length of the recording arm 23 as a radius, and the transverse rock shaft 22 as a center. The inner ends of the cross lines are suitably spaced to measure off the distance between the hour marks as indicated on the glass dial of the instrument, and each of the curved cross lines is intended, when the chart is first inserted, to register with one of the hour marks of the clock face. The twelve spaces may be further subdivided by lines 34 to indicate half a quarter hour or any other subdivisions of an hour which may be found desirable.

The speed indicator is actuated by means of a speed indicator arm 35 rigidly secured to the rock shaft 22 and provided on its end with a curved rack 36, giving an L formation to the speed indicator arm as a whole, and the teeth of the rack are intended to mesh with a pinion 37 on a rotatable speed indicator dial 38 having marked thereon figures 39 indicating the speed per hour of the automobile or other vehicle. The figures are readable through a slot 40 in the plate 6, which slot is preferably marked with an indicating arrow or line 41. The figures on the cyclometer are also readable through a similar slot 42 immediately above the cyclometer.

The cyclometer is operated by means of a worm gear 43 which meshes with a worm 44 on the actuating shaft 10.

In operation the revolution of the running gear revolves the actuating shaft, and the revolution tends to throw out the governor balls in the usual manner, and this spreading of the governor balls carries down the arm 21 and turns the rock shaft more or less, depending upon the speed of revolution of the actuating shaft and the throw of the governor balls. As the rock shaft is turned it moves the recording arm and stylus inwardly the requisite distance to register by a continuous line the speed of the automobile. As the speed changes the recording arm will be moved accordingly, and the record line will indicate the change in speed at any particular time. It will be understood that simultaneously with the movement of the recording arm the record chart will be revolved at a fixed rate of speed, so that it will be possible, after the complete record has been taken, to determine the exact rate of speed of the automobile at any particular hour or fraction thereof. Simultaneously with the marking of the permanent record the rate of travel will be constantly indicated so that the operator can see at a glance just how fast the machine is running, which is a matter of great importance in operating automobiles in cities or towns where speed ordinances are enforced. By marking the hour numbers on the glass of the instrument rather than upon the dial, no difficulty is experienced in positioning the record charts, which can be inserted and removed without difficulty since they are rotatable with the permanent plane center disk which is secured to the arbor of the hour hand. At the same time the white surface of the disk forms a suitable background for the figures on the glass which are as easily visible as if marked on the surface of the disk in the usual manner. The location and arrangement of the mechanism is one which combines all of the recording instruments into an integral whole which can be suitably secured in the front part of the automobile, and actuated by a single power transmission shaft, and this arrangement is greatly superior to one in which different recording instruments are located at different places on the machine and independently operated.

A blank recording chart can be inserted for each day run, and such charts can be suitably dated or otherwise identified and filed away for future reference, which enables the operator to readily determine as to the efficiency of the machine, and also as to the condition of the roads traveled over, which information is a matter of great importance in the operation of automobiles. By locating, mounting and operating the instruments in the manner above specified, the device as a whole may be made extremely attractive in appearance and compact in form, which is important in view of the fact that it is desirable to save as much space as possible, owing to the complexity of the operating machinery and the need of space for the mounting and operation of levers, valves and similar devices.

What I claim as new and desire to secure by Letters Patent is:

1. In a device of the class described, in combination with a clock mechanism, a face plate surrounding the arbor for the hour hand and revoluble therewith and adapted to revolve a chart, a stationary transparent clock face having the hour numbers marked thereon in a ring in front of the face plate, and a recording arm carrying an inscribing instrument, the latter being movable under the transparent clock face and outside of the ring of hour numerals, substantially as described.

2. In a device of the class described, in combination with a clock mechanism, a face plate surrounding the arbor for the hour hand and revoluble therewith and adapted to revolve a chart, a stationary transparent clock face having the hour numbers marked thereon in a ring in front of the face plate, a recording arm carrying an inscribing instrument, the latter being movable under the transparent clock face and outside of the ring of hour numerals, an actuating shaft, a governor on the actuating shaft, and a connection between the governor and the recording arm for moving the recording arm to inscribe a record on the chart when inserted, substantially as described.

3. In a device of the class described, the combination of a casing, a glass face for the casing inscribed with the numbers of a clock, a clock mechanism within the casing, a plain face for the clock immediately beneath the numerals inscribed on the glass and adapted to have mounted thereon, a recording chart, the plain face being rotated by the clock mechanism, a recording arm adapted to inscribe a line on the chart, and mechanism for moving the recording arm, substantially as described 4. In a device of the class described, the combination of a casing, a glass face for the casing inscribed with the numbers of a clock, a clock mechanism within the casing, a plain face for the clock immediately beneath the numerals inscribed on the glass and adapted to have mounted thereon, a recording chart, the plain face being rotated by the clock mechanism, a recording arm adapted to inscribe a line on the chart, an actuating shaft, and a governor adapted to move the recording arm, substantially as described.

5. In a device of the class described, the combination of a casing, a glass cover for the casing inscribed with numerals, a clock mechanism, a plain face for the clock, a recording chart in the form of a ring surrounding the space occupied by the numerals inscribed on the glass cover, both the plain face and chart being revolved by the clock mechanism, the chart being divided into a series of concentric rings indicating speed, and further divided by means of a series of cross lines indicating periods of time, a recording arm, a stylus on the recording arm, mechanism for moving the recording arm to inscribe a line on the revolving chart, a revoluble disk inscribed to indicate rates of speed and adapted to be actuated simultaneously with the recording arm, substantially as described.

GEORGE EDWARD MIRFIELD.

Witnesses:
 FRANK STONEBURNER,
 GUY L. MEAKER.